(12) United States Patent
Shu et al.

(10) Patent No.: US 9,753,939 B2
(45) Date of Patent: Sep. 5, 2017

(54) DATA SYNCHRONIZATION METHOD AND DATA SYNCHRONIZATION SYSTEM FOR MULTI-LEVEL ASSOCIATIVE STORAGE ARCHITECTURE, AND STORAGE MEDIUM

(71) Applicant: TENCENT TECHNOLOGY (SHENZHEN) COMPANY LIMITED, Shenzhen (CN)

(72) Inventors: Jun Shu, Shenzhen (CN); Ming Tian, Shenzhen (CN); Lihua Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 224 days.

(21) Appl. No.: 14/439,672

(22) PCT Filed: Oct. 29, 2013

(86) PCT No.: PCT/CN2013/086177
§ 371 (c)(1),
(2) Date: Apr. 30, 2015

(87) PCT Pub. No.: WO2014/067452
PCT Pub. Date: May 8, 2014

(65) Prior Publication Data
US 2015/0286653 A1    Oct. 8, 2015

(30) Foreign Application Priority Data

Nov. 5, 2012 (CN) .......................... 2012 1 0435819

(51) Int. Cl.
*G06F 7/00* (2006.01)
*G06F 17/30* (2006.01)
(Continued)

(52) U.S. Cl.
CPC ...... *G06F 17/30174* (2013.01); *G06F 3/0604* (2013.01); *G06F 3/065* (2013.01);
(Continued)

(58) Field of Classification Search
CPC ......... G06F 17/30174; G06F 17/30156; G06F 17/30191; G06F 3/0604; G06F 3/067; G06F 3/065
See application file for complete search history.

(56) References Cited

U.S. PATENT DOCUMENTS 7,908,448 B1    3/2011   Chatterjee et al.
8,677,055 B2 *  3/2014   Ouye ................ G06F 17/30519
                                                      711/103
(Continued)

FOREIGN PATENT DOCUMENTS

CN    101308513 A    11/2008
CN    101625880 A    1/2010
(Continued)

OTHER PUBLICATIONS

Written Opinion [English translation], International Application No. PCT/CN2013/086177, Jan. 30, 2014.
(Continued)

*Primary Examiner* — Daniel Kuddus
(74) *Attorney, Agent, or Firm* — Marshall, Gerstein & Borun LLP

(57) ABSTRACT

A data synchronization method for a multi-level associative storage architecture includes: receiving, by a master module, a request of an external write operation, writing data into a write buffer of the master module, and recording a digit sequence according to the write operation on the write buffer of the master module; flushing data from the write buffer to solid-state disk (SSD) files when a data amount in the write buffer of the master module reaches a threshold; recording,
(Continued)

by the master module, a digit sequence for a flush operation; separately synchronizing, by the master module, the write operation and the flush operation to a slave module according to orders of digits in different digit sequences; and receiving, by the slave module, the synchronous write operation and synchronous flush operation, and separately synchronizing the data of the master module to corresponding locations of a local write buffer and local SSD files.

8 Claims, 3 Drawing Sheets

(51) Int. Cl.
  *G06F 3/06* (2006.01)
  *G06F 11/20* (2006.01)
(52) U.S. Cl.
  CPC .......... *G06F 3/067* (2013.01); *G06F 11/2097* (2013.01); *G06F 17/30575* (2013.01); *G06F 11/2038* (2013.01); *G06F 11/2048* (2013.01); *G06F 2201/82* (2013.01)

(56) References Cited

U.S. PATENT DOCUMENTS

| | | | | |
|---|---|---|---|---|
| 8,700,842 | B2* | 4/2014 | Dinker | G06F 17/30519 711/103 |
| 8,745,320 | B2* | 6/2014 | Gupta | G06F 3/0656 711/103 |
| 8,868,487 | B2* | 10/2014 | Krishnan | G06F 9/5027 707/607 |
| 2005/0154847 | A1* | 7/2005 | Trembecki | G06F 11/2058 711/162 |
| 2008/0235443 | A1* | 9/2008 | Chow | G06F 12/0851 711/103 |
| 2010/0098390 | A1 | 4/2010 | Nakane | |
| 2011/0207654 | A1* | 8/2011 | Barber | C07K 5/06078 514/1.1 |
| 2011/0307736 | A1* | 12/2011 | George | G06F 17/30519 714/6.2 |
| 2013/0297855 | A1* | 11/2013 | Gupta | G06F 3/0656 711/103 |
| 2013/0318283 | A1* | 11/2013 | Small | G06F 12/0246 711/103 |

FOREIGN PATENT DOCUMENTS

| CN | 101808127 A | 8/2010 |
|---|---|---|
| CN | 102255958 A | 11/2011 |

OTHER PUBLICATIONS

Search Report in International Application No. PCT/CN2013/086177 dated Jan. 30, 2014.
Office Action in CN Application No. 201210435819.1 dated Feb. 20, 2017, 11 pages.
International Preliminary Report on Patentability and Written Opinion in International Application No. PCT/CN2013/086177 dated May 5, 2015, 8 pages.

* cited by examiner

DATA SYNCHRONIZATION METHOD AND DATA SYNCHRONIZATION SYSTEM FOR MULTI-LEVEL ASSOCIATIVE STORAGE ARCHITECTURE, AND STORAGE MEDIUM

RELATED APPLICATION

This patent application claims priority to Chinese Patent Application No. 201210435819.1, entitled "DATA SYNCHRONIZATION METHOD AND DATA SYNCHRONIZATION SYSTEM FOR MULTI-LEVEL ASSOCIATIVE STORAGE ARCHITECTURE" and field by TENCENT TECH (SHENZHEN) CO LTD on Nov. 5, 2012, which is incorporated by reference in its entirety.

FIELD OF THE TECHNOLOGY

The present disclosure relates to the field of data storage, and in particular, to a data synchronization method and a data synchronization system for a multi-level associative storage architecture, and a storage medium.

BACKGROUND OF THE DISCLOSURE

FIG. 1 is a schematic diagram of an existing storage architecture and a synchronization manner thereof, where a master module is configured to process external write requests and read requests, a slave module is configured to receive synchronous data update from the master module, and the slave module can only process external read requests. As shown in FIG. 1, a synchronization principle of this synchronization manner is as follows: a service is deployed in multiple parts, that is, one master module and multiple slave modules; when external write requests are sent to the master module, each time an external write request arrives, the master module records a digit sequence, where the digit sequence increases progressively in order as the number of write requests increases; the master module synchronizes write operations to the slave modules according to the order of digits in the digit sequences; when receiving the write operation sent from the master module, each slave module updates local data, and records a digit sequence of the local data; and when the digit sequence of the master module is the same as that of the slave module, it indicates that data of the slave module is latest data. A basic idea of this synchronization manner is synchronizing each write operation to the slave module, to ensure that data of the slave module can be updated in real time and is the same as that of the master module.

However, this synchronization manner is designed for relatively simple storage models, for example, one-level storage and multi-level non-associative storage. However, this synchronization manner is not applicable to a multi-level associative storage architecture (shown in FIG. 2) used by some companies (for example, Tencent) at present.

In the storage architecture used at present, data is stored in solid-state disk (SSD) files and a write buffer is added above the SSD files according to an implementation principle of an SSD, so as to improve write performance of the SSD and prolong the service life of the SSD as much as possible. In the storage architecture shown in FIG. 2, a storage location of data in the SSD file determines a storage location offset of the data in the write buffer, and storage locations of data in the write buffer need to be one-to-one corresponding to storage locations in the SSD files.

If the synchronization manner shown in FIG. 1 is applied to the storage architecture shown in FIG. 2, the following problems may arise:

(1) Problem of data consistency: According to this synchronization manner, after the master module synchronizes the write operation to the slave module according to the order of digits in the digit sequence, the slave module writes data into the write buffer first, and flushes all data in the write buffer to SSD files when a data amount in the write buffer reaches a regulated threshold. During this process, it is hard to ensure that when the slave module writes data into the write buffer, a relative location of each piece of data in the write buffer of the slave module is the same as that in the write buffer of the master module; besides, when the slave module flushes the data from the write buffer to the SSD files, it is also hard to ensure that storage locations of data blocks flushed to the SSD files are the same as storage locations in the SSD files of the master module; if any of the storage locations of the data in the write buffer or in the SSD files of the slave module is not the same as a corresponding storage location of the data in the write buffer or in the SSD files of the master module, the data becomes invalid data that cannot be read by a user.

(2) Problem of design complexity: If the problem of data accuracy in (1) needs to be solved, the design of synchronization logic may become quite complex.

SUMMARY

In view of this, the present disclosure provides a data synchronization method and a data synchronization system for a multi-level associative storage architecture, which can ensure data consistency and have a simple design.

The data synchronization method and data synchronization system for a multi-level associative storage architecture are implemented by means of the following technical solutions:

A data synchronization method for a multi-level associative storage architecture includes: receiving, by a master module, a request of an external write operation, writing data into a write buffer of the master module, and recording a first digit sequence according to the write operation on the write buffer of the master module; flushing data from the write buffer of the master module to SSD files of the master module when a data amount in the write buffer of the master module reaches a threshold, storage locations of the data in the SSD files of the master module being one-to-one corresponding to storage locations in the write buffer of the master module during flushing; recording, by the master module, a second digit sequence for a flush operation; synchronizing, by the master module, the write operation to a slave module according to an order of digits in the first digit sequence, and synchronizing the flush operation to the slave module according to an order of digits in the second digit sequence; synchronizing, by the slave module, the data of the write buffer of the master module to corresponding locations of a local write buffer when receiving the synchronous write operation; and synchronizing, by the slave module, the SSD files of the master module to corresponding locations of local SSD files when receiving the synchronous flush operation.

A data synchronization system for a multi-level associative storage architecture includes: a master module, configured to process a request of an external write operation and an external read request; a slave module, configured to process an external read request; a write buffer of the master module, configured to buffer the request of the external write operation; SSD files of the master module, configured to receive data flushed from the write buffer when a data amount in the write buffer reaches a threshold; a write buffer of the slave module, configured to receive synchronization data from the write buffer of the master module; and SSD files of the slave module, configured to receive synchronization data from the SSD files of the master module, data synchronization on the write buffer of the slave module and data synchronization on the SSD files of the slave module being separate from each other.

The present disclosure further provides one or more storage media containing a computer executable instruction, the computer executable instruction being used for executing a data synchronization method for a multi-level associative storage architecture, and the method including the following steps:

receiving, by a master module, a request of an external write operation, writing data into a write buffer of the master module, and recording a first digit sequence according to the write operation on the write buffer of the master module;

flushing data from the write buffer of the master module to SSD files of the master module when a data amount in the write buffer of the master module reaches a threshold, storage locations of the data in the SSD files of the master module being one-to-one corresponding to storage locations in the write buffer of the master module during flushing;

recording, by the master module, a second digit sequence for a flush operation;

synchronizing, by the master module, the write operation to a slave module according to an order of digits in the first digit sequence, and synchronizing the flush operation to the slave module according to an order of digits in the second digit sequence;

synchronizing, by the slave module, the data of the write buffer of the master module to corresponding locations of a local write buffer when receiving the synchronous write operation; and synchronizing, by the slave module, the SSD files of the master module to corresponding locations of local SSD files when receiving the synchronous flush operation.

In summary, the present disclosure at least has the following advantages:

(1) Data consistency can be ensured. The master module synchronizes the data of the write buffer of the master module to the write buffer of the slave module and synchronizes the data of the SSD files of the master module to the SSD files of the slave module, which ensures that the data can be stored at correct locations in the write buffer and the SSD files of the slave module, thereby ensuring the consistency and the accuracy of data synchronization.

(2) The design is simple, and the reliability of the system is improved. The write buffer is decoupled from the SSD files during synchronization, so that the write buffer and the SSD files synchronize respective data separately without caring about whether storage locations of the data in the write buffer are one-to-one corresponding to storage locations of the data in the SSD files.

To make the foregoing and other objectives, features, and advantages of the present invention easier to understand, a detailed description is made below by using listed preferred embodiments with reference to the accompanying drawings.

DESCRIPTION OF EMBODIMENTS

To further explain the technical means used in the present disclosure for achieving the intended objectives and the effects thereof, specific implementation manners, structures, features, and effects of a data synchronization method and a data synchronization system for a multi-level associative storage architecture provided in the present disclosure are described in detail below with reference to the accompanying drawings and preferred embodiments.

Figure 1:
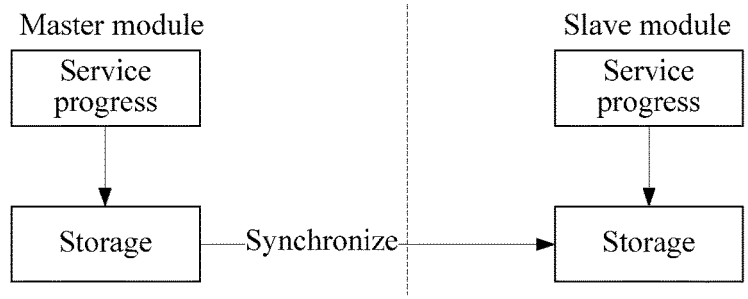
FIG. 1 is a schematic diagram of an existing storage architecture and a synchronization manner thereof.
Figure 2:
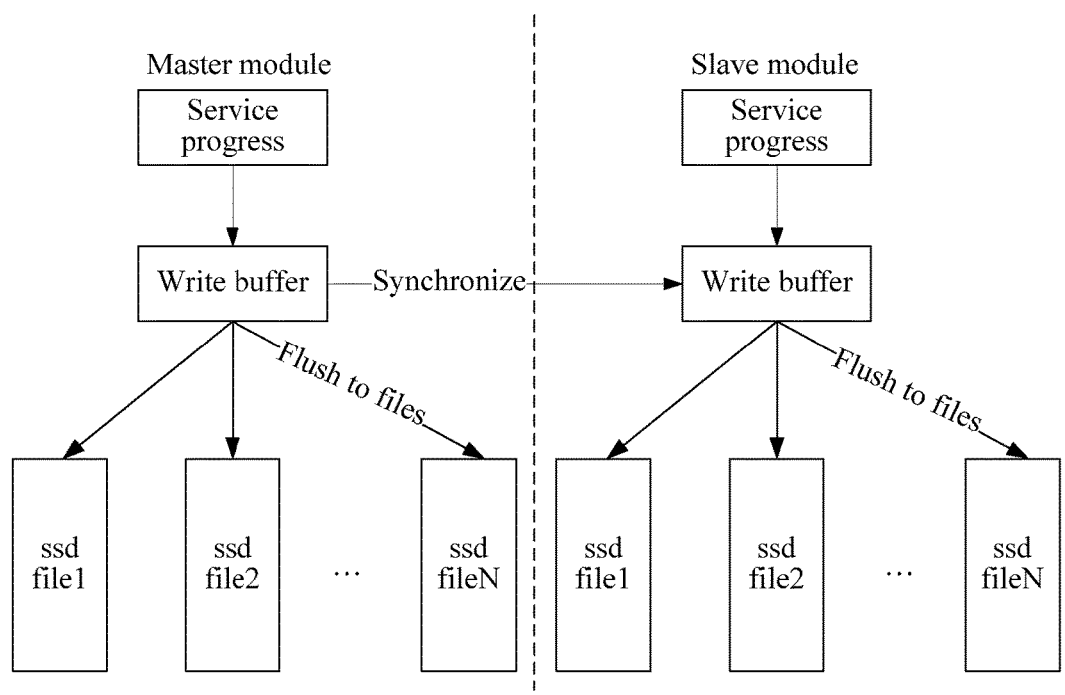
FIG. 2 is a schematic diagram of a storage architecture used at present.
Figure 3:
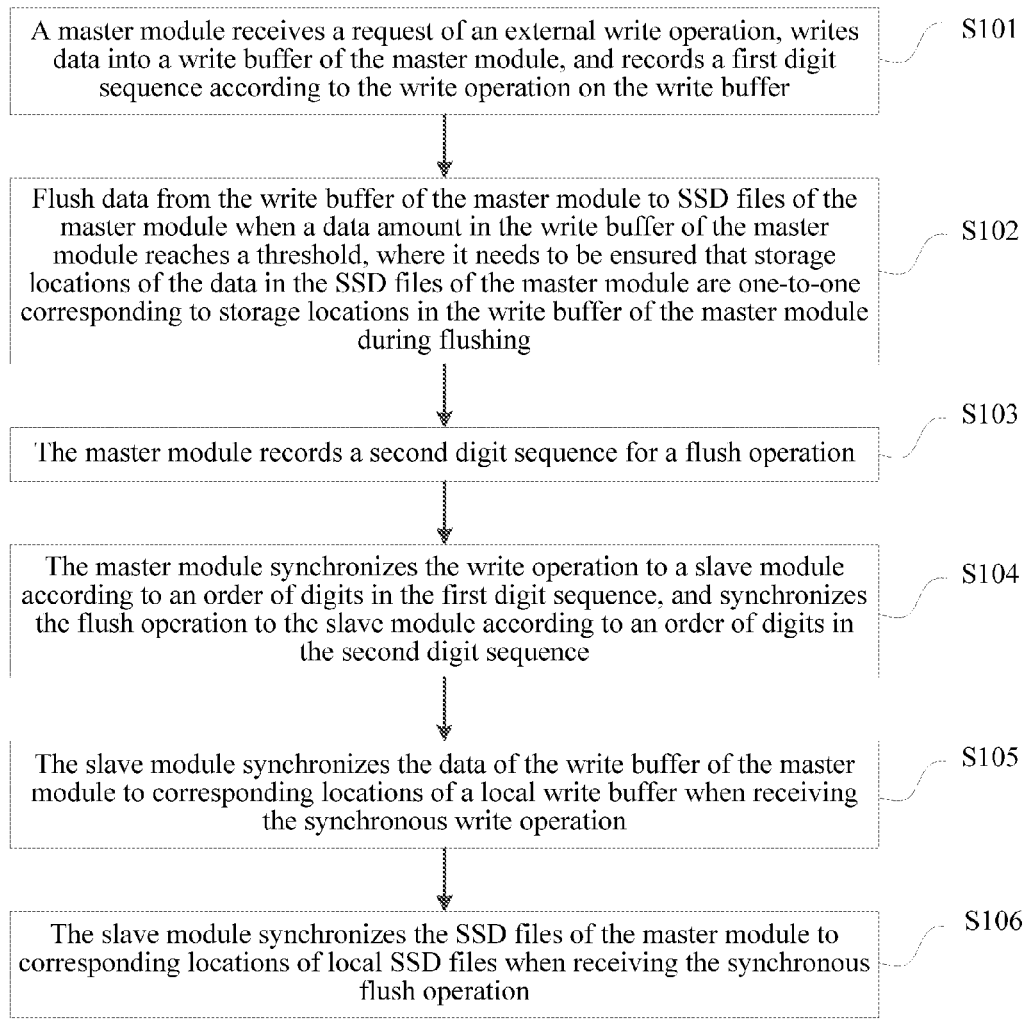
FIG. 3 is a flowchart of a data synchronization method for a multi-level associative storage architecture disclosed by the present disclosure.

FIG. 3 is a flowchart of a data synchronization method for a multi-level associative storage architecture disclosed by the present disclosure. As shown in FIG. 3, the data synchronization method for a multi-level associative storage architecture disclosed by the present disclosure includes the following steps:

S101: A master module receives a request of an external write operation, writes data into a write buffer of the master module, and records a first digit sequence according to the write operation on the write buffer.

S102: Flush data from the write buffer of the master module to SSD files of the master module when a data amount in the write buffer of the master module reaches a threshold, where it needs to be ensured that storage locations of the data in the SSD files of the master module are one-to-one corresponding to storage locations in the write buffer of the master module during flushing.

S103: The master module records a second digit sequence for a flush operation.

S104: The master module synchronizes the write operation to a slave module according to an order of digits in the first digit sequence, and synchronizes the flush operation to the slave module according to an order of digits in the second digit sequence.

S105: The slave module synchronizes the data of the write buffer of the master module to corresponding locations of a local write buffer when receiving the synchronous write operation.

S106: The slave module synchronizes the SSD files of the master module to corresponding locations of local SSD files when receiving the synchronous flush operation.

The master module is configured to process a request of an external write operation and an external read request, the slave module is configured to receive synchronous data update from the master module, and the slave module can only process an external read request.

Further, the data synchronization method further includes:

receiving, by the write buffer of the master module, data written by the master module, and sorting, in the unit of 4K, the written data into N data blocks; and flushing, in the unit of the data blocks, the data from the write buffer of the master module to the SSD files of the master module when the data amount in the write buffer of the master module reaches the threshold.

Specifically, the threshold is M times of 4K, M being an integer greater than or equal to N.

In summary, the data synchronization method for a multi-level associative storage architecture of the present disclosure at least has the following advantages:

(1) Data accuracy can be ensured. The master module synchronizes the data of the write buffer of the master module to the write buffer of the slave module and synchronizes the data of the SSD files of the master module to the SSD files of the slave module, which ensures that the data can be stored at correct locations in the write buffer and the SSD files of the slave module, thereby ensuring the consistency and the accuracy of data synchronization.

(2) The design is simple, and the reliability of the system is improved. The write buffer is decoupled from the SSD files during synchronization, so that the write buffer and the SSD files synchronize respective data separately without caring about whether storage locations of the data in the write buffer are one-to-one corresponding to storage locations of the data in the SSD files.

Figure 4:
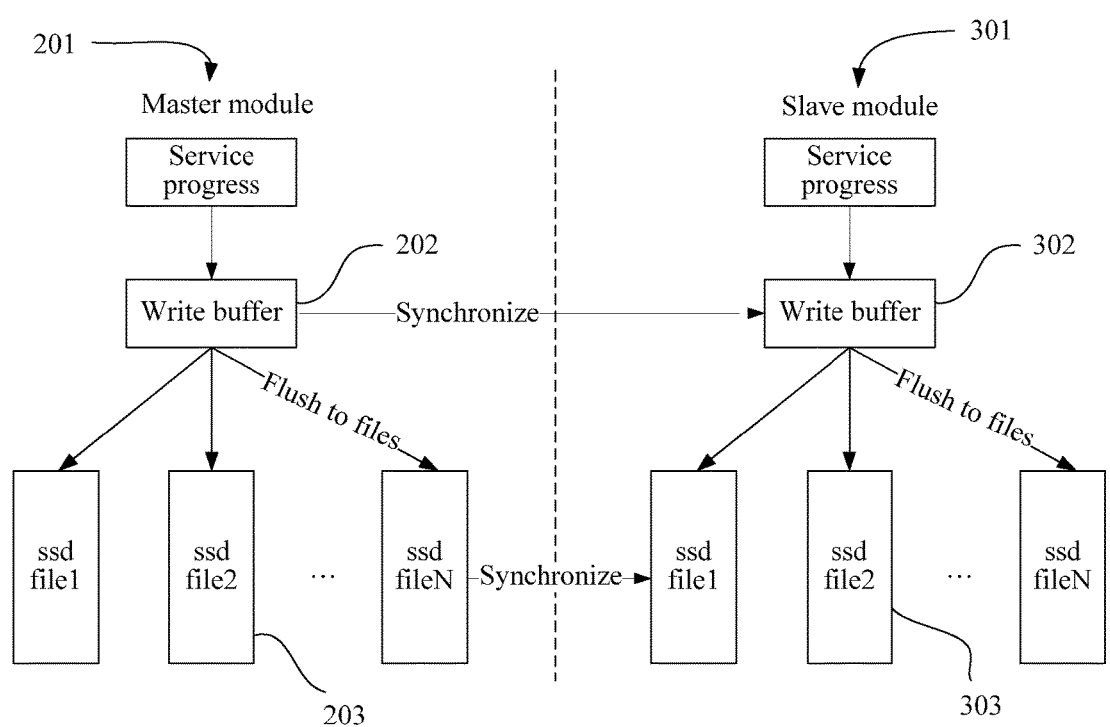
FIG. 4 is a schematic diagram of an architecture and a synchronization manner of a data synchronization system for a multi-level associative storage architecture disclosed by the present disclosure.

FIG. 4 is a schematic diagram of an architecture and a synchronization manner of a data synchronization system for a multi-level associative storage architecture disclosed by the present disclosure. As shown in FIG. 4, the data synchronization system for a multi-level associative storage architecture of the present disclosure includes:

a master module 201, configured to process a request of an external write operation and an external read request;

a slave module 301, configured to process an external read request;

a write buffer 202 of the master module, configured to buffer the request of the external write operation;

SSD files 203 of the master module, configured to receive data flushed from the write buffer of the master module when a data amount in the write buffer of the master module reaches a threshold, storage locations of the data in the SSD files 203 of the master module being one-to-one corresponding to storage locations in the write buffer 202 of the master module;

a write buffer 302 of the slave module, configured to receive synchronization data from the write buffer 202 of the master module; and SSD files 303 of the slave module, configured to receive synchronization data from the SSD files 203 of the master module, data synchronization on the write buffer 302 of the slave module and data synchronization on the SSD files 303 of the slave module being separate from each other.

Further, the master module 201 is further configured to record, when the request of the external write operation is written into the write buffer 202 of the master module, a first digit sequence according to the write operation on the write buffer 202 of the master module, and synchronize the write operation to the slave module 301 according to an order of digits in the first digit sequence. The write buffer 302 of the slave module does not perform data synchronization until the slave module 301 receives the synchronous write operation.

Further, the master module 201 is further configured to record, when data of the write buffer 202 of the master module is flushed to the SSD files 203 of the master module, a second digit sequence according to a flush operation, and synchronize the flush operation to the slave module 301 according to an order of digits in the second digit sequence. The SSD files 303 of the slave module do not perform data synchronization until the slave module 301 receives the synchronous flush operation.

Further, the write buffer 202 of the master module is further configured to sort, in the units of 4K, the written data into N data blocks when receiving the data written by the master module 201. The data is flushed, in the unit of the data blocks, from the write buffer 202 of the master module to the SSD files 203 of the master module.

Specifically, the threshold is M times of 4K, M being an integer greater than or equal to N.

In summary, the data synchronization system for a multi-level associative storage architecture of the present disclosure at least has the following advantages:

(1) Data accuracy can be ensured. The master module synchronizes the data of the write buffer of the master module to the write buffer of the slave module and synchronizes the data of the SSD files of the master module to the SSD files of the slave module, which ensures that the data can be stored at correct locations in the write buffer and the SSD files of the slave module, thereby ensuring the consistency and the accuracy of data synchronization.

(2) The design is simple, and the reliability of the system is improved. The write buffer is decoupled from the SSD files during synchronization, so that the write buffer and the SSD files synchronize respective data separately without caring about whether storage locations of the data in the write buffer are one-to-one corresponding to storage locations of the data in the SSD files.

It should be noted that, an embodiment of the present invention further provides a computer readable storage medium that stores a computer executable instruction therein, where the computer readable storage medium may be a non-volatile memory such as an optical disc, a hard disk or a flash memory.

The computer executable instruction is used for causing a computer to perform the following operations: receiving, by a master module, a request of an external write operation, writing data into a write buffer of the master module, and recording a first digit sequence according to the external write operation on the write buffer of the master module; flushing data from the write buffer of the master module to SSD files of the master module when a data amount in the write buffer of the master module reaches a threshold; recording, by the master module, a second digit sequence for a flush operation; separately synchronizing, by the master module, the write operation and the flush operation to a slave module according to orders of digits in the first digit sequence and in the second digit sequence; synchronizing, by the slave module, the data of the write buffer of the master module to corresponding locations of a local write buffer when receiving the synchronous write operation; and synchronizing, by the slave module, the SSD files of the master module to corresponding locations of local SSD files when receiving the synchronous flush operation.

Further, the computer executable instruction is further used for causing a computer to perform the following operations: receiving, by the write buffer, data written by the master module, and sorting, in the unit of 4K, the written data into N data blocks; and flushing, in the unit of the data blocks, the data from the write buffer to the SSD files.

By means of the instruction described above, the present disclosure decouples the write buffer from the SSD files, so that the write buffer and the SSD files synchronize respective data separately, which can ensure the accuracy and consistency of the data and the simplicity of synchronization processing, and improve the reliability of the system.

The above descriptions are merely preferred embodiments of the present invention, and are not intended to limit the present disclosure in any form. Although the present disclosure has been disclosed above through the preferred embodiments, the embodiments are not intended to limit the present disclosure. A person skilled in the art can make some equivalent variations, alterations or modifications to the above-disclosed technical content without departing from the scope of the technical solutions of the present disclosure to obtain equivalent embodiments. Any simple alteration, equivalent change or modification made to the above embodiments according to the technical essence of the present disclosure without departing from the content of the technical solutions of the present disclosure shall fall within the scope of the technical solutions of the present disclosure.

What is claimed is:

1. A data synchronization method for a multi-level associative storage architecture, the method comprising:
   receiving, by a master module, a request of an external write operation, writing data into a write buffer of the master module, and recording a first digit sequence according to the write operation on the write buffer of the master module;
   flushing data from the write buffer of the master module to solid-state disk (SSD) files of the master module in response to determining that a data amount in the write buffer of the master module reaches a threshold, storage locations of the data in the SSD files of the master module being one-to-one corresponding to storage locations in the write buffer of the master module during flushing;
   recording, by the master module, a second digit sequence for a flush operation;
   synchronizing, by the master module, the write operation to a slave module according to an order of digits in the first digit sequence, and synchronizing the flush operation to the slave module according to an order of digits in the second digit sequence;
   synchronizing, by the slave module, the data of the write buffer of the master module to corresponding locations of a local write buffer in response to receiving the synchronous write operation; and
   synchronizing, by the slave module, the SSD files of the master module to corresponding locations of local SSD files in response to receiving the synchronous flush operation.

2. The data synchronization method for a multi-level associative storage architecture according to claim 1, wherein the master module is configured to process a request of an external write operation and an external read request, the slave module is configured to receive synchronous data update from the master module, and the slave module can only process an external read request.

3. The data synchronization method for a multi-level associative storage architecture according to claim 1, further comprising:
   receiving, by the write buffer of the master module, data written by the master module, and sorting, in the unit of 4K, the written data into N data blocks; and
   flushing, in the unit of the data blocks, the data of the write buffer to the SSD files.

4. The data synchronization method for a multi-level associative storage architecture according to claim 3, wherein the threshold is M times of 4K, M being an integer greater than or equal to N.

5. A data synchronization system for a multi-level associative storage architecture, the system comprising:
   a master module, configured to process a request of an external write operation and an external read request;
   a slave module, configured to process a request of an external read operation;
   a write buffer of the master module, configured to buffer the external request of the write operation;
   solid-state storage (SSD) files of the master module, configured to receive data flushed from the write buffer of the master module in response to determining that a data amount in the write buffer of the master module reaches a threshold; and
   a write buffer of the slave module, configured to receive synchronization data from the write buffer of the master module;
   the system further comprising:
   SSD files of the slave module, configured to receive synchronization data from the SSD files of the master module,
   data synchronization on the write buffer of the slave module and data synchronization on the SSD files of the slave module being separate from each other,
   wherein the master module is further configured to record, in response to the external request of the write operation being written into the write buffer of the master module, a first digit sequence according to the request of the external write operation, and synchronize the write operation to the slave module according to an order of digits in the first digit sequence, and the write buffer of the slave module does not perform data synchronization until the slave module receives the synchronous write operation; and
   the master module is further configured to record, in response to flushing the data of the write buffer of the master module is flushed to the SSD files of the master module, a second digit sequence according to a flush operation, and synchronize the flush operation to the slave module according to an order of digits in the second digit sequence, and the SSD files of the slave module do not perform data synchronization until the slave module receives the synchronous flush operation.

6. The data synchronization system for a multi-level associative storage architecture according to claim 5, wherein the write buffer of the master module is further configured to sort, in the unit of 4K, the written data into N data blocks in response to receiving the data written by the master module, and the data is flushed, in the unit of the data blocks, from the write buffer of the master module to the SSD files of the master module.

7. The data synchronization system for a multi-level associative storage architecture according to claim 6, wherein the threshold is M times of 4K, M being an integer greater than or equal to N.

8. At least one non-transitory storage medium containing a computer executable instruction, the computer executable instruction being used for executing a data synchronization method for a multi-level associative storage architecture, and the method comprising:
   receiving, by a master module, a request of an external write operation, writing data into a write buffer of the master module, and recording a first digit sequence according to the write operation on the write buffer of the master module;
   flushing data from the write buffer of the master module to solid-state disk (SSD) files of the master module in response to determining that a data amount in the write buffer of the master module reaches a threshold, storage locations of the data in the SSD files of the master module being one-to-one corresponding to storage locations in the write buffer of the master module during flushing;

recording, by the master module, a second digit sequence for a flush operation;

synchronizing, by the master module, the write operation to a slave module according to an order of digits in the first digit sequence, and synchronizing the flush operation to the slave module according to an order of digits in the second digit sequence;

synchronizing, by the slave module, the data of the write buffer of the master module to corresponding locations of a local write buffer in response to receiving the synchronous write operation; and synchronizing, by the slave module, the SSD files of the master module to corresponding locations of local SSD files in response to receiving the synchronous flush operation.

* * * * *